(12) United States Patent
Zhang et al.

(10) Patent No.: US 11,868,944 B2
(45) Date of Patent: Jan. 9, 2024

(54) CONTAINER IMAGE MANAGEMENT SYSTEM FOR DISTRIBUTED CLUSTERS

(71) Applicant: Nanjing University of Posts and Telecommunications, Nanjing (CN)

(72) Inventors: Dengyin Zhang, Nanjing (CN); Junjiang Li, Nanjing (CN); Can Chen, Nanjing (CN); Chao Zhou, Nanjing (CN); Zijie Liu, Nanjing (CN)

( * ) Notice: Subject to any disclaimer, the term of this patent is extended or adjusted under 35 U.S.C. 154(b) by 597 days.

(21) Appl. No.: 17/118,571

(22) Filed: Dec. 10, 2020

(65) Prior Publication Data

US 2021/0097477 A1 Apr. 1, 2021

Related U.S. Application Data

(63) Continuation-in-part of application No. PCT/CN2020/094454, filed on Jun. 4, 2020.

(30) Foreign Application Priority Data

Sep. 5, 2019 (CN) .......................... 201910836417.4

(51) Int. Cl.
*G06Q 10/08* (2023.01)
*G01N 21/90* (2006.01)
*G06F 3/0484* (2022.01)

(52) U.S. Cl.
CPC ............. *G06Q 10/08* (2013.01); *G01N 21/90* (2013.01); *G06F 3/0484* (2013.01)

(58) Field of Classification Search
CPC ....... G06Q 10/08; G01N 21/90; G06F 3/0484
See application file for complete search history.

(56) References Cited

U.S. PATENT DOCUMENTS

2020/0244297 A1* 7/2020 Zalewski ................ H04W 4/70
2020/0310394 A1* 10/2020 Wouhaybi ............ H04L 67/125

\* cited by examiner

*Primary Examiner* — Kristie D Shingles

(57) ABSTRACT

A container image management system for distributed clusters, the system including at least one master node and at least one worker node. The at least one master node includes a container image database, a request input module and a container image management module. The container image management module is responsive when the container image management module establishes the connection to the container image database, then it is configured to perform a read/write operation on the container image database. The container image database is a distributed database configured to store node information of the at least one master node and the at least one worker node in the container image management system. The request input module is configured to receive request content including a request destination and command execution content. The command execution content includes an execution operation field and an executed container image list.

6 Claims, 5 Drawing Sheets

CONTAINER IMAGE MANAGEMENT SYSTEM FOR DISTRIBUTED CLUSTERS

CROSS-REFERENCE TO RELATED APPLICATIONS

This application is a continuation-in-part of International Patent Application No. PCT/CN2020/094454 with an international filing date of Jun. 4, 2020, designating the United States, now pending, and further claims foreign priority benefits to Chinese Patent Application No. 201910836417.4 filed Sep. 5, 2019. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of computers, and more particularly to a container image management system for distributed clusters.

With the development of science and technology, the deployment of micro-services into containers improves the utilization of resources. With the increasing development of applications, the deploying mode of one container per application cannot satisfy the requirements. Particularly when an application is under high load and the service cannot be interrupted, it is necessary to deploy the application in replicas in order to improve the concurrent accessibility and avoid a single point of failure. When multiple replicas provide services as a whole, a container cluster is formed.

A container cluster generally contains a plurality of nodes, including a selected master node that acts as a management node on which a container image management module is deployed to manage images on other worker nodes. The configuration update information generated during each parameter configuration process by the container image management module is usually stored in a local database of the master node. To realize the management of container images while avoiding the waste of a large number of storage resources caused by excessive outdated container images, each worker node needs to initiate an inquiry request to the master node so as to perform a pull operation, an update operation, a delete operation and a prune operation on local container images. The master node receives the inquiry request transmitted by the worker node, checks the container images of the worker node and transmits the required operation to the worker node, so that the management of container images of the worker node is realized.

When there are more than 10 worker nodes, the master node needs to successively transmit operation commands to the worker nodes according to the requests transmitted by the worker nodes. There will be certain delay and possibility of misoperation.

SUMMARY

The disclosure provides a master node for a container image management system for distributed clusters. The master node is applied to a container image management system for distributed clusters; the container image management system comprises at least one master node and at least one worker node; and each master node comprises: a container image database, a request input module and a container image management module;

the container image management module is responsive when the container image management module establishes the connection to the container image database, then it is configured to perform a read/write operation on the container image database;

the container image database is a distributed database configured to store node information of the container image management system, the node information comprising the current state of a node, command execution content, command execution time and a command execution state log which are all stored in a distributed database of the master node, the current state of the worker node comprising the node name, the node role, the operating system of the worker node and the kernel version of the operating system, the operation version of the container runtime on the worker node, the time when the node joins the cluster and the time when the worker node is updated;

the request input module is configured to receive request content comprising a request destination and command execution content, the command execution content comprising an execution operation field and an executed container image list;

the container image management module is configured to: generate a public key and a private key used for encrypted authentication; verify whether the request content acquired by the request input module is validated, and store the request content in the container image database if the request content is validated; and determine the request destination in the request content, inquire the container image database to obtain the IP address corresponding to a specified single worker node or a specified group of worker nodes if the request destination is the specified single worker node or the specified group of worker nodes, and transmit the communication secret and the command execution content to the specified single worker node or the specified group of worker nodes according to the IP address corresponding to the specified single worker node or the specified group of worker nodes, the operation contained in the command execution content comprising a pull operation, an update operation, a delete operation and a prune operation; and the container image management module is further configured to receive state feedback content transmitted by the specified single worker node or the specified group of worker nodes, and store the receipt time and the state feedback content in the container image database.

With this technical solution, the flat management of container cluster container images is realized, the management efficiency of the container images is improved, the rate of container operation information flows is accelerated, the persistent storage of all operation content of container images is realized, and it is convenient for event auditing, fault location and later maintenance. Moreover, by verifying the request content, the reliability of container image management is improved, misoperations or invalidated operations are avoided, and the effectiveness of communicative connection of nodes during operation and the high availability and security of the whole cluster are ensured.

To realize the scalability and stability of the system, the worker nodes are added to the system or new worker nodes are authorized to the system in time after a sudden fault occurs in a worker node. Meanwhile, to improve the security of the system, the container image management module further comprises a Web server. The Web server is configured to block monitoring, and wait for a cluster join request from the worker node that applies for joining a cluster. If the cluster join request sent by the worker node is received, the container image management module authenticates the communication secret in the cluster join request, and the node name, the node role, the operating system, the kernel version of the operating system, the version of the container runtime, the request time and communication secret in the cluster join request are written in the container image database after the authentication is successful. The update time for the worker node that applies for joining the cluster is set and written in the container image database, and a cluster join success message is returned to the cluster. Thus, the operation stability and scalability of nodes in a cluster are ensured, and the efficient and safe operation is realized by verifying the cluster join request from a worker node.

To improve the efficiency of batch processing of container images in the cluster and further improve the container image management efficiency of the system, in response to the joining of the worker node into the cluster, the container image management module stores all worker nodes and tags of the worker nodes as a datasheet in the container image database.

The container image management module determines whether the request destination acquired by the request input module contains a specified tag; inquire a worker node list corresponding to a specified tag in the container image database to obtain the IP address corresponding to the specified tag in the list if the request destination acquired by the request input module contains the specified tag; and, transmit the command execution content to the worker node corresponding to the specified tag according to the IP address corresponding to the specified tag, the operation contained in the command execution content comprising a pull operation, an update operation, a delete operation and a prune operation. In this technical solution, the operating range and operating environment of each worker node in the system are specified, and node objects executing operations are known, so that the batch management capabilities of worker nodes that are engaged in different transactions in the system are enhanced, and the container image management efficiency of the system is further improved.

To determine faults and errors that may occur during the operation of the system so as to deal with the faults and errors in time, the master node further comprises a fault message generation and report module. The fault message generation and report module is configured to generate a message for the cause of failure if the verification of the request content by the container image management module is unsuccessful or if the verification of the request content by the container image management module is successful but the container image management module is not permitted to read/write from/into the database, and serialize the message as a fault text file for reporting. In this technical solution, a fault can be quickly located by an operation and maintenance engineer, and it is convenient for future security auditing. Moreover, it is beneficial for the operation and maintenance engineer to find the cause of errors and solve the problem, so that the system can quickly restore to the normal operation.

In another aspect, the disclosure provides a worker node for a container image management system for distributed clusters; the worker node is applied to a container image management system for distributed clusters; the container image management system for distributed clusters comprises at least one master node and at least one worker node; and each worker node comprises: a container image controller proxy component and a container image repository;

the container image repository is configured to store container images on the worker node, and distinguish different container images by container image names and container image tags;

the container image controller proxy component is configured to transmit node information of the worker node to the master node, the node information comprising the current state of the worker node, command execution content, command execution time and a command execution state log which are all stored in a distributed database of the master node, the current state of the worker node comprising the node name, the node role, the operating system of the worker node and the kernel version of the operating system, the operation version of a container runtime on the worker node, the time when the worker node joins a cluster, and the time when the worker node is updated;

the container image controller proxy component is further configured to acquire the request content from the master node, the request content comprising the communication secret and the command execution content, the command execution content comprising an execution operation field and an executed container image list; and the worker node authenticates the communication secret and executes, on the container image repository, an operation corresponding to the command execution content by calling the container runtime, the container image repository comprising a local container image repository and a container image repository deployed remotely, the operation comprising a pull operation, an update operation, a delete operation and a prune operation; and, the worker node transmits state feedback content to the master node.

If the request content passes the validity check of the master node and if the request destination is a specified single worker node or a specified group of worker nodes, the specified single worker node or specified group of worker nodes corresponding to the IP address can receive the command execution content transmitted by the master node; and if the request destination is a specified tag, worker nodes corresponding to the IP address in a worker node list corresponding to the specified tag can receive the command execution content transmitted by the master node.

Further, when the container runtime is running, the container image controller proxy component acquires a communication key-value pair from environmental variables, and then initiates a cluster join request to the master node by the IP address and the communication secret of the master node acquired using the communication key-value pair, the cluster join request comprising the node name, the node role, the operating system, the kernel version of the operating system, the version of the container runtime, the request time and the communication secret; and, if the communication secret is successfully authenticated, the container image controller proxy component receives, from the master node, a message indicating success in joining the cluster.

Furthermore, the worker node further comprises a fault generation and report module; when the container image controller proxy component determines that the container runtime operates abnormally, failing to acquire the communication key-value pair from the environmental variables or not receiving the master node's response to the cluster join request after a preset time, the fault generation and report module determines an unsuccessful cluster joining, and is configured to generate a message for the cause of failure and serialize the message as a fault text file for reporting.

Further, the request content acquired from the master node by the container image controller proxy component of the worker node comprises a command execution time and an execution period; if neither the command execution time nor the execution period is set, a corresponding operation is executed immediately; if the request content comprises only the command execution time but not the execution period, the container image control proxy component of the worker node will block and wait for the command execution time before executing the corresponding operation; if the command execution time is not set but only the execution period is set, the container image controller proxy component of the worker node immediately executes the corresponding operation, and asynchronously enables blocking and indefinitely waits for a next execution period to execute the corresponding operation; and, if both the command execution time and the execution period are set, the container image control proxy component of the worker node will block and wait for the command execution time before executing the corresponding operation, and the container image control proxy component of the worker node enables blocking and indefinitely waits for a next execution period to execute the corresponding operation after a first execution is completed.

In a third aspect, the disclosure provides a container image management system for distributed clusters, the system comprising at least one master node described above and at least one worker node described above; and when the system comprises a plurality of master nodes, each master node is connected to a load balancer in the network, the worker node sets the IP address of the master node as the serving IP address of the load balancer during configuration, and the distributed databases running on the plurality of master nodes are used for data synchronization between different master nodes.

In a fourth aspect, the disclosure provides a method for container image management of distributed clusters, the method comprising:

storing, by a master node and in a distributed database, node information of all master nodes or worker nodes, the node information comprising the current state of a node, command execution content, command execution time and a command execution state log which are all stored in the distributed database of the master node, the current state of the worker node comprising the node name, the node role, the operating system of the worker node and the kernel version of the operating system, the operation version of a container runtime on the worker node, the time when the worker node joins a cluster and the time when the worker node is updated;

receiving, by the master node, request content comprising a request destination and command execution content, the command execution content comprising an execution operation field and an executed container image list;

determining, by the master node, whether the request content is validated, and storing the request content in the container image database if the request content is validated; determining whether the request destination in the request content is a specified single worker node or a specified group of worker nodes, inquiring the container image database to obtain the IP address corresponding to the specified single worker node or the specified group of worker nodes if the request destination is the specified single worker node or the specified group of worker nodes, and transmitting the command execution content to the specified single worker node or the specified group of worker nodes according to the IP address corresponding to the specified single worker node or the specified group of worker nodes, the operation contained in the command execution content comprising a pull operation, an update operation, a delete operation and a prune operation;

calling, by the worker node, a container runtime to execute a corresponding operation on a container image repository, and transmitting state feedback content to the master node, the container image repository comprising a container image repository deployed locally and a container image repository deployed remotely; and receiving, by the master node, the state feedback content from the worker node, and storing the receipt time and the state feedback content in the distributed database.

In accordance with the disclosure, the flat management of container images is realized, the management efficiency of container images is improved, the rate of container operation information flows is accelerated, the persistent storage of all operation content of container images is realized, and it is convenient for event auditing, fault location and later maintenance. Moreover, by verifying the request content, the reliability of container image management is improved, misoperations or invalidated operations are avoided, and the effectiveness of communicative connection of nodes during operation and the high availability and security of the whole cluster are ensured.

The disclosure ensures the operation stability and scalability of nodes in a cluster, and realizes efficient and safe operation by verifying the cluster join request from a worker node.

In the disclosure, the operating range and operating environment of each worker node in the system are specified, and node objects executing operations are known, so that the batch management capabilities of worker nodes that are engaged in different transactions in the system are enhanced, and the container image management efficiency of the system is further improved.

In the disclosure, a fault can be quickly located by an operation and maintenance engineer, and it is convenient for future security auditing. Moreover, it is beneficial for the operation and maintenance engineer to find the cause of errors and solve the problem, so that the system can quickly restore to the normal operation.

DETAILED DESCRIPTION

In view of the problems that the existing container image management systems for container clusters are low in efficiency and need to be improved in reliability and security, the disclosure provides a method for container image management of distributed clusters.

Example 1

Figure 1:
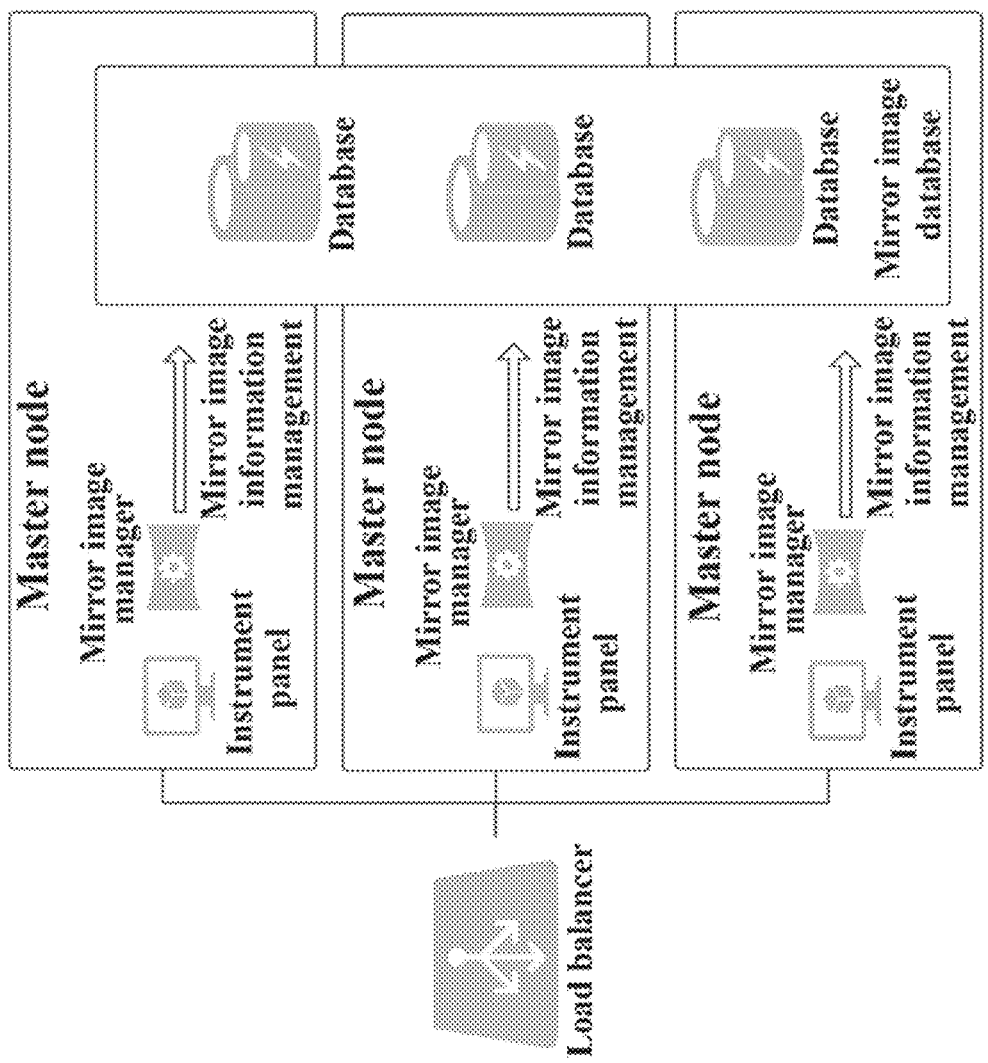
FIG. 1 is an architecture diagram of a master node for container image management of distributed clusters according to a specific embodiment of the disclosure.

FIG. 1 is a block diagram of a master node for distributed container cluster management. In the system, the master node is a control node that functions to store and control cluster information and generally does not run container-related services. The master node specifically comprises:

a container image database, a request input module and a container image management module.

The container image management module responds to that the container image management module establishes the connection to the container database and the container image management module is permitted to read/write from/into the container database.

The container image database is a distributed database and configured to store node information of the container image management system for distributed clusters, the node information comprising the current state of a node, command execution content, command execution time and a command execution state log which are all stored in the distributed database of the master node, the current state of the worker node comprising the node name, the node role, the operating system of the worker node and the kernel version of the operating system, the operation version of a container runtime on the worker node, the time when the worker node joins a cluster and the time when the worker node is updated.

The request input module is configured to receive request content comprising a request destination and command execution content, the command execution content comprising an execution operation field and an executed container image list.

The container image management module, also referred to as a container image management module, comprises a Web server which supports mutual TLS and authentication. The Web server is permitted to read/write from/into the container image database running on the master node, and is mainly configured to acquire request records sent by a user from the request input module and store the request records in the database, and can transmit, to worker nodes, commands related to container images, allow the worker nodes to execute related commands according to the user's commands, and receive results returned by the worker nodes after executing commands and store the results in the database. The commands comprise four operation commands, i.e., add, update, delete and prune.

Specifically, the container image management module is configured to: generate a public key and a private key used for encrypted authentication; verify whether the request content acquired by the request input module is validated, and store the request content in the container image database if the request content is validated; determine the request destination in the request content, inquire the container image database to obtain the IP address corresponding to the specified single worker node or the specified group of worker nodes if the request destination is the specified single worker node or the specified group of worker nodes, and transmit the communication secret and the command execution content to the specified single worker node or the specified group of worker nodes according to the IP address corresponding to the specified single worker node or the specified group of worker nodes, the operation contained in the command execution content comprising a pull operation, an update operation, a delete operation and a prune operation.

The container image management module is further configured to receive state feedback content transmitted by the specified single worker node or the specified group of worker nodes, and store the receipt time and the state feedback content in the container image database.

In an actual operating environment, to avoid a single point of failure, there may be a plurality of master nodes in this system. The system shown in FIG. 1 comprises three master nodes. The number of worker nodes is configured as required. Each master node is connected to a load balancer in the network, each worker node only needs to set the IP address of the master node as the serving IP address of the load balancer during configuration process, and the load balancer rationally forwards the traffic to the back-end master nodes to improve the management capability of the master nodes in the system. In a test environment, the function of this system can be realized when there is more than one master node in this system.

In certain embodiments, the request input module is realized by an instrument panel. The request input module is a container image management of distributed clusters graphical interface which realizes interaction with a user. The user can execute related commands and operations on a worker node or a group of worker nodes by the instrument panel, and the instrument panel indirectly send the related instruments through the container image management module. Optionally, the request input module can be realized by other existing technologies, which are not limited to this embodiment and will not be repeated here.

Figure 3:
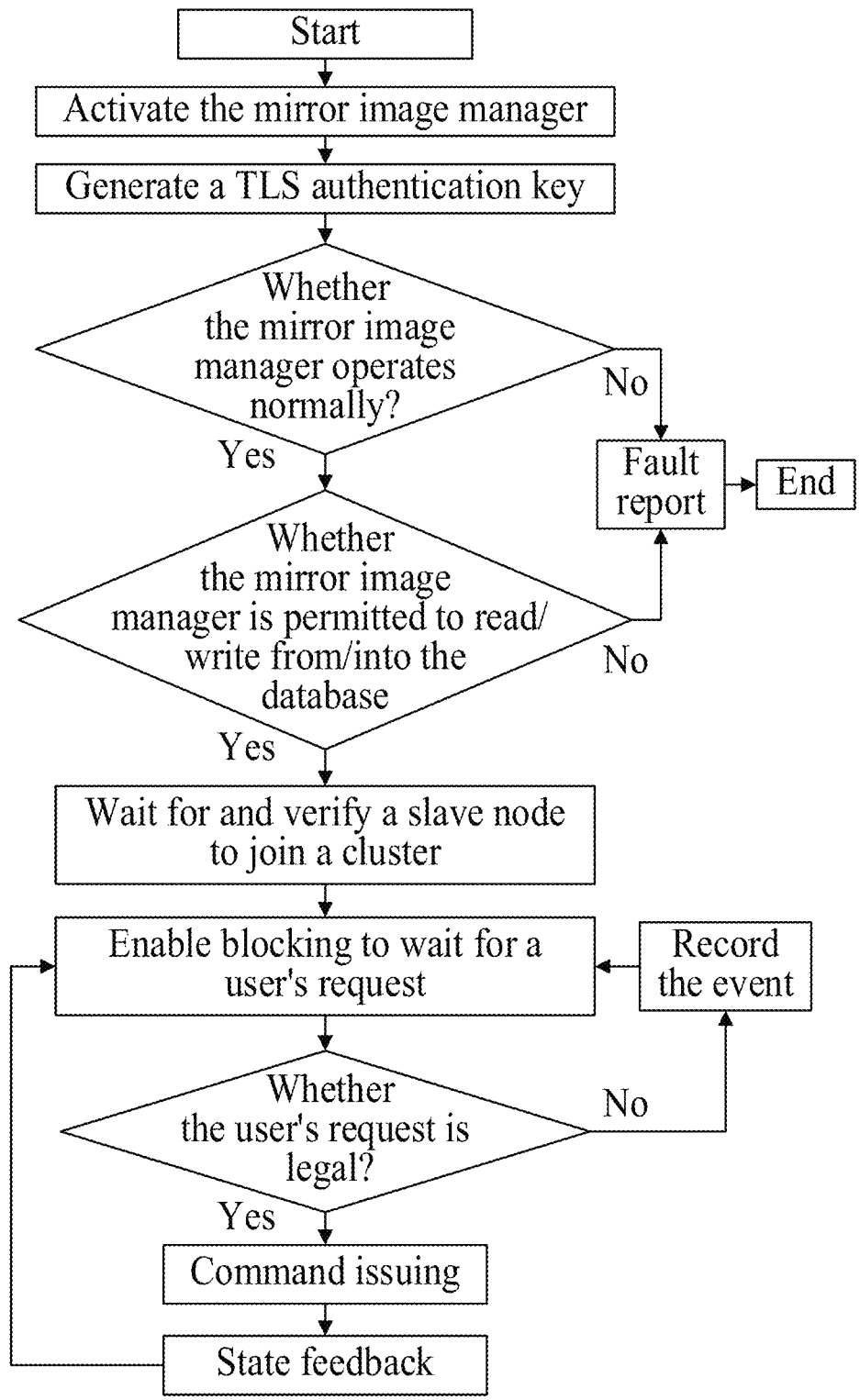
FIG. 3 is a flowchart of the operation of the master node for container image management of distributed clusters according to a specific embodiment of the disclosure.

The flow of A method of management of distributed clusters applied to the master node in this embodiment will be described below (as shown in FIG. 3).

Initialization of the master node: the container image management module is activated on the master node. The container image management module tries to connect the distributed database. If the database is connected successfully and the container image management module is permitted to read-write the database, the database and a datasheet are created, the activation event is written into the database, and the container image management module generates a communication secret composed of a TLS public key and a private key for encrypted authentication.

The master node activates the instrument panel. The instrument panel firstly verifies whether the container image management module is running on the current node and whether the container image management module operates normally. If the container image management module has been launched and operates normally, it directly establishes a connection with the container image management module, and blocking is enabled to wait for a user's request. If the user's request is received, the master node firstly determines whether the request comes from an internal network. If the request comes from an external network, the request is discarded, and an external request event and a request receipt time are acquired and written into the database. If the request comes from an internal network, the instrument panel firstly verifies whether each field corresponding to the request content is validated.

The validity verification comprises: the field integrity of the request content; the standardization of the request content; if the execution time in the request content is not null, verifying whether the execution time is greater than the current time plus 40 seconds; and, if there is an object list in the request content, checking the standardization of the container image format in the list once; or the like.

If the request fails to pass the verification, the invalidated field is fed back to the user, then the request content and the request submission time are stored in the database; otherwise, no operation is performed; and, if the container image management module is not running or the container image management module operates abnormally, a text file will be generated for the cause of failure and stored on a magnetic disk.

If it is determined that the request is validated, the instrument panel serializes the fields of the request content into text content in a JSON format, and initiates a request to the container image management module in the current node by using the text content as the request content.

The container image management module of the master node firstly determines the type of the request; and if the request destination is a specified worker node or a specified group of worker nodes, the container image management module cyclically and asynchronously issues a command to each worker node in the request destination.

The method for issuing a command by the master node comprises the following steps. The container image management module of the master node firstly inquires, from the container image database, the IP address and the communication secret corresponding to a worker node. Then, the container image management module of the master node sends a HTTPS command execution request to the worker node by using the IP address; the destination address of the command execution request is the IP address of the worker node; the request header carries the communication secret of the worker node; and, the request content is a specific command execution content comprising an execution operation field and an execution container image list. The whole HTTPS command request is encrypted, encapsulated and sent to the worker node by using a TLS secret key generated by the command. After the command execution request is sent, the worker node will execute an operation corresponding to the command execution content, and the container image management module of the master node will send a result of command execution after the worker node executes the operation and send the result of execution to the data container image database.

The master node executes state feedback recording: upon receiving the reply from the worker node, the container image management module of the master node store, in the database, the receipt time and the reply content as objects; if the reply of task completion is received, a task completion notification is send to the instrument panel in the master node, and the instrument panel generates a task completion notification in the request result to inform the user that the task is completed; and then, the instrument panel of the master node enables blocking again to wait for the user's request, and the whole cluster enters a next step cycle.

In certain embodiments, the flat management of container images is realized, the management efficiency of container images is improved, the rate of container operation information flows is accelerated, the persistent storage of all operation content of container images is realized, and it is convenient for event auditing, fault location and later maintenance. Moreover, by verifying the request content, the reliability of container image management is improved, misoperations or invalidated operations are avoided, and the effectiveness of communicative connection of nodes during operation and the high availability and security of the whole cluster are ensured.

Example 2

To realize the scalability and stability of the system, it is possible to add worker nodes in the system or authorize new worker nodes to the system in time after a sudden fault occurs in a worker node, and this improves the security of the system.

Based on Example 1, the container image management module further comprises a Web server. The Web server is configured to block monitoring, and wait for a cluster join request from a worker node. If the cluster join request sent by the worker node is received, the container image management module authenticates the communication secret in the cluster join request, and the node name, the node role, the operating system, the kernel version of the operating system, the version of the container runtime, the request time and communication secret in the cluster join request are written into the container image database after the authentication is successful. The update time for this worker node is set and written into the container image database, and a cluster join success message is returned to the cluster.

The master node enables the Web server in the container image management module to block monitoring, and waits for a cluster join request from a worker node. If the cluster join request from the worker node is received at the current moment, the validity of the request is firstly verified, that is, it is verified whether a key-value pair in the request is consistent with the key-value pair stored locally. If the key-value pair in the request is consistent with the key-value pair stored locally, the node name, the node role, the operating system, the kernel version of the operating system, the version of the container runtime, the request time and communication secret in the cluster join request are written into the database, the update time for this worker node is written into the database as the request time, and a joining success message is returned to the cluster.

Example 3

To improve the efficiency of batch processing of container images in the cluster, based on the Example 2, in response to the joining of the worker node into the cluster, the container image management module stores information of all worker nodes and tags set for worker nodes as a datasheet in the container image database.

If the container image management module determines that the request destination acquired by the request record input module contains a specified tag, the container image management module inquires a worker node list corresponding to this tag in the container image database to obtain the IP address corresponding to worker nodes in the list, and transmit command execution content to the worker nodes according to the corresponding IP address, the operation contained in the command execution content comprising a pull operation, an update operation, a delete operation and a prune operation.

When all worker nodes join a cluster through the master node, a cluster operation and maintenance engineer needs to store, in the database, the nodes in the cluster and the tags attached to these nodes as datasheets for further task execution (for example, a tag of worker is set for all operating nodes in the cluster or a tag of tester is set for test nodes in the cluster).

The container image management module of the master node determines the type of the request. If the request destination contains a specified tag, the container image management module outputs all worker nodes with tags that are the specified tag as the request destination by inquiring the container image database, and then cyclically and asynchronously issues a command to these worker nodes. The command issuing method is the same as that in Embodiment 1 and will not be repeated here.

In certain embodiments, by setting tags for worker nodes, the batch management capabilities of worker nodes that are engaged in different transactions in the system are enhanced, and the container image management efficiency of the system is further improved.

Example 4

To timely determine faults and errors that may occur during the operation of the system, based on the above examples, the master node further comprises a fault message generation and report module. The fault message generation and report module is configured to generate a message for the cause of failure if the verification of the request content by the container image management module is unsuccessful or if the verification of the request content by the container image management module is successful but the container image management module is not permitted to read/write from/into the database, and serialize the message as a fault text file for reporting.

The method for executing the fault message generation and report module will be described below. If the validity verification of the request content by the container image management module of the master node is unsuccessful, the cause of failure is recorded, and a fault message is generated; and, if the database is connected unsuccessfully or if the database is connected successfully but the container image management module is not permitted to read/write from/into the database, the cause of failure is recorded, and a fault message is generated. Then, the message is serialized into a text file as an e-mail, and an e-mail address set by the operation and maintenance engineer is acquired from the environmental variables in this node to send this e-mail, so that the fault in the current node and the cause of failure are informed to the operation and maintenance engineer, and it is convenient for the operation and maintenance engineer to quickly check and repair errors.

In another aspect, the disclosure provides a worker node for a container image management system for distributed clusters. The worker node is applied to a container image management system for distributed clusters. The container image management system for distributed clusters comprises at least one master node and at least one worker node.

Example 5

Figure 2:
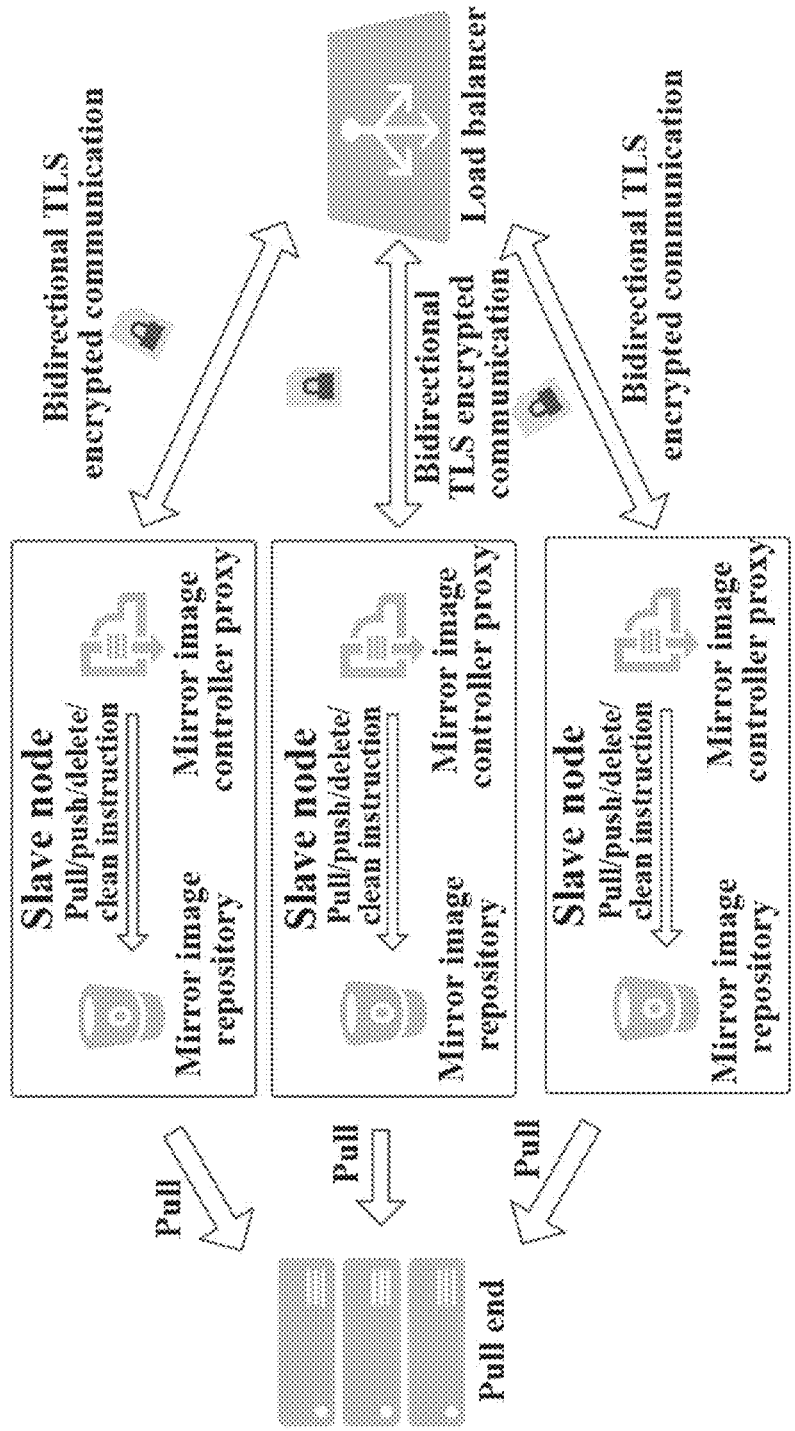
FIG. 2 is an architecture diagram of a worker node for container image management of distributed clusters according to a specific embodiment of the disclosure.

In the worker node for a container image management system for distributed clusters, each worker node for container image management of distributed clusters comprises a container image controller proxy component and a container image repository (as shown in FIG. 2).

The container image repository is configured to store container images on the worker node, and distinguish different container images by container image names and container image tags.

The container image controller proxy component comprises a Web server which supports mutual TLS and communication secret authentication. The Web server can execute, on the container image repository, operations of pulling container images, pushing container images, deleting container images, pruning expired container images or the like. The Web server acquires operation information from the master information, then executes the operation, and returns the result of execution to the master node. Specifically, the container image controller proxy component is configured to transmit node information of a worker node to the master node, the node information comprising the current state of the worker node, command execution content, command execution time and a command execution state log which are all stored in a distributed database of the master node, the current state of the worker node comprising the node name, the node role, the operating system of the worker node and the kernel version of the operating system, the operation version of a container runtime on the worker node, the time when the worker node joins a cluster, and the time when the worker node is updated.

The container image controller proxy component is further configured to acquire the request content from the master node, the request content comprising the communication secret and the command execution content, the command execution content comprising an execution operation field and an executed container image list.

The worker node authenticates the communication secret and executes, on the container image repository, an operation corresponding to the command execution content by calling the container runtime, the container image repository comprising a local container image repository and a container image repository deployed remotely, the operation comprising a pull operation, an update operation, a delete operation and a prune operation; and, the worker node transmits state feedback content to the master node.

If the request content passes the validity check of the master node and if the request destination is a specified single worker node or a specified group of worker nodes, the worker nodes corresponding to the IP address can receive the command execution content transmitted by the master node; and if the request destination contains a specified tag, worker nodes corresponding to the IP address in a worker node list corresponding to this tag can receive the command execution content transmitted by the master node.

Figure 4:
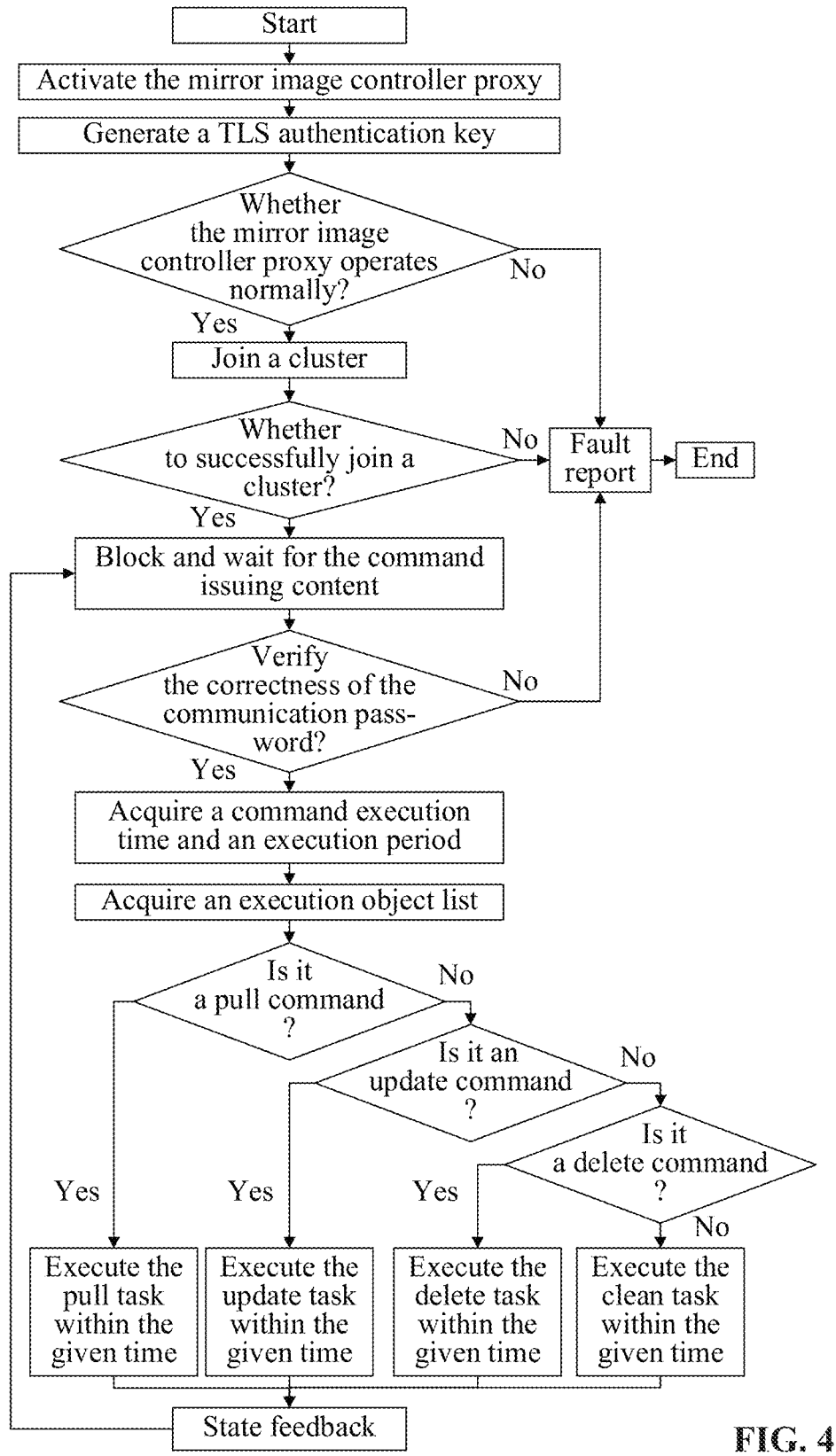
FIG. 4 is a flowchart of the operation of the worker node for container image management of distributed clusters according to a specific embodiment of the disclosure.

A method of management of distributed clusters applied to the worker node provided in this example is detailed as follows (as shown in FIG. 4).

Upon receiving a request from the master node, the container image controller proxy component of the worker node firstly verifies whether the communication secret in a request header is the same as the local communication secret; if the communication secret in the request header is different from the local communication secret, the container image controller proxy component replies an authentication failure to the master node, and encrypts this replay by the communication secret and then sends this reply to the container image management module of the master node; and, if the communication secret in the request header is the same as the local communication secret, the container image controller proxy component of the worker node determines an operation to be executed in this request, comprising a pull operation, an update operation, a delete operation and a prune operation.

Example 6

Based on Example 1, the worker node further comprises the following. When the container runtime is running, the container image controller proxy component acquires a communication key-value pair from environmental variables, and then initiates a cluster join request to the master node by the IP address and the communication secret of the master node acquired using the communication key-value pair, the cluster join request comprising the node name, the node role, the operating system, the kernel version of the operating system, the version of the container runtime, the request time and the communication secret; and, if the communication secret is successfully authenticated, the container image controller proxy component receives, from the master node, a message indicating success in joining the cluster.

A method of management of distributed clusters applied to the worker node provided in this example is detailed as follows.

The worker node activates the container image controller proxy component, and the container image controller proxy component checks whether the current node has launched a container runtime. If the current node has run the container runtime and operates normally, this node tries to acquire a communication key-value pair from environmental variables. If the communication key-value pair is successfully acquired from the environmental variables, the IP address and the communication secret of the master node are acquired using the key-value pair, and a cluster join request is initiated to the master node by the IP address and the communication secret acquired using the key-value pair. If the communication secret is authenticated successfully, the container image controller proxy component receives, from the master node, a message indicating success in joining the cluster.

Example 7

Based on the above examples, after the worker node successfully joins a cluster, the container image controller proxy component of the worker node sends an update request to the master node every 5 minutes. The update request content comprises the current node role (master node or worker node) of the node, the operating system, the kernel version of the operating system, and the node transmitting and updating time. Upon receiving this request, the master node updates the data corresponding to these fields in the database. At this time, the master node recursively inquires the update time for each node in the database every 10 minutes and then compares the update time with the current time. If the time difference is within 10 minutes, no operation will be performed. If the time difference is more than 10 minutes, the master node determines this node as a fault node and removes this node from the cluster. Based on the above embodiments, by setting the heartbeat detection program, it is determined whether a worker node operates normally or is disconnected abnormally.

Example 8

Based on the above examples, the worker node further comprises a fault generation and report module configured to respond to the unsuccessful verification of the communication secret in the request content transmitted to the master node by the worker node.

When the container image controller proxy component determines that the container runtime operates abnormally, fails to acquire the communication key-value pair from the environmental variables or does not receive the master node's response to cluster join request after a preset time so as to determine unsuccessful cluster joining, a message is generated for the cause of failure, and this message is serialized as a fault text file for reporting.

The node records the cause of failure and generates a message. The content of the message is the cause of failure.

Then, the message is serialized into a text file as an e-mail, and an e-mail address set by the operation and maintenance engineer is acquired from the environmental variables in this node to send this e-mail, so that the fault in the current node and the cause of failure are informed to the operation and maintenance engineer, and it is convenient for the operation and maintenance engineer to quickly check and repair errors.

In certain embodiments, the request content acquired from the master node by the container image controller proxy component of the worker node comprises a command execution time and an execution period. If neither the command execution time nor the execution period is set, a corresponding operation is executed immediately. If the request content comprises only the command execution time but not the execution period, the container image control proxy component of the worker node will block and wait for the command execution time before executing the corresponding operation. If the command execution time is not set but only the execution period is set, the container image controller proxy component of the worker node immediately executes the corresponding operation, and asynchronously enables blocking and indefinitely waits for a next execution period to execute the corresponding operation. If both the command execution time and the execution period are set, the container image control proxy component of the worker node will block and wait for the command execution time before executing the corresponding operation, and the container image control proxy component of the worker node enables blocking and indefinitely waits for a next execution period to execute the corresponding operation after a first execution is completed.

In certain embodiments, the pull operation is implemented as follows.

The container image controller proxy component of the worker node extracts an object list in the request content. A series of container image names to be pulled are stored in the object list. Then, the container image controller proxy component calls an underlying container runtime to synchronously pull container images in the container image list, and stores these container images in the local container image repository. If the container images in the list already exist in the local image repository, the container controller proxy component calls the container runtime to directly pull container images and cover the original container images. During this process, if the container images corresponding to the pulled container image names do not exist or it is overdue or unsuccessful to pull container images, the container image controller proxy component asynchronously replies the container image pull error to the master node, the specific cause of error is used as the reply content, and the reply is encrypted by the generated communication secret and then sent to the container image management module of the master node. Subsequently, the master node executes the process described in the above embodiments. Then, a next container image in the list will be pulled. After the last container image in the object list is pulled, the container image controller proxy component replies task completion to the master node, and the reply is encrypted by the communication secret and then sent to the master node, so that the pull task is completed. Meanwhile, the container image management module of the master node receives the reply and executes the process described in the above embodiments.

In certain embodiments, the update operation is implemented as follows.

The container image controller proxy component of the worker node firstly exacts an object list in the request content. A series of container image names to be updated are stored in the object list. Then, the container image controller proxy component calls an underlying container runtime to synchronously update container images in the container image list in the container image repository. During this process, the container image controller proxy component will determine whether a container image to be updated exists in the container image repository of this node. If this container image does not exist in the local container image repository, the container image controller proxy component asynchronously replies the master node a message indicating that this container image does not exist in the container image repository, the reply is encrypted by the communication secret and then sent to the master node, and a next container image in the list will be updated. Meanwhile, the container image management module of the master receives the message and then executes the process described in the above embodiments. If this container image exists in the container image repository, the container image controller proxy component compares the container image stored in the container image repository with a container image with the same name at the pull end by using the hash code in the container image standard. If the both are the same in hash code, that is, the two container images are the same in content and do not need to be updated, the container image controller asynchronously replies the master node a message indicating that this container image does not needs to updated, this message is encrypted by the communication secret and then sent to the master node, and a next container image in the list will be updated. If the both are different in hash code, the container image at the pull end is pulled, and the local container image is deleted so that the update operation is completed, and a next container image in the list will be continuously updated. After the last container image in the object list is pulled, the container image controller proxy component replies task completion to the master node, and the reply is encrypted by the communication secret and then sent to the master node, so that the update task is completed. At this time, the container image management module of the master node receives the reply and then executes the process described in the above embodiments.

In certain embodiments, the delete operation is implemented as follows.

The container image controller proxy component of the worker node firstly extracts an object list in the request content. A series of container image names to be deleted are stored in the object list. Then, the container image controller proxy component calls an underlying container runtime to synchronously delete container images in the container image list in the container image repository. During this process, if a container image corresponding to the container image name to be deleted does not exist in the local container image repository, the container image controller proxy component asynchronously replies the master node that this container image does not exist in the container image repository, the reply is encrypted by the communication secret and then sent to the master node, and a next container image in the list will be continuously deleted synchronously. Meanwhile, the container image management module of the master node receives the reply and then executes the process described in the above embodiments. If the container image name to be deleted exists in the container image repository, the container controller proxy continuously determines whether a container on this node using this container image name to be deleted is running this container image; if not, the container image controller proxy component calls the container runtime on this node to delete this container image; and, if so, the container image controller proxy component asynchronously replies the master node that the container image is being used and cannot be deleted, the reply is encrypted by the communication secret and then sent to the master node, and a next container image in the list will be continuously deleted synchronously. Meanwhile, the container image management module of the master node receives the reply and then executes the process described in the above embodiments. After the last container image in the object list is deleted, the container image controller proxy component replies task completion to the master node, and the reply is encrypted by the communication secret and then sent to the master node, so that the delete task is completed. Meanwhile, the container image management module of the master node receives the reply and then executes the process described in the above embodiments.

In certain embodiments, the prune operation is implemented as follows.

The container image controller of the worker node firstly generates a running container image list for the container images running on the current node. Container images used by the container running on the current node are recorded in this list. Then, a repository container image list is generated for the container images in the container image repository of the current node. Container images of all containers on the current node are recorded in this list. Subsequently, the container image controller synchronously determines whether a container image in the repository container image list exists in the running container image list. If this container image exists in the running container image list, no operation will be executed, and it is continuously determined whether a next container image in the repository container image list satisfies this condition. If this container image does not exist in the running container image list, this container image is removed, and it is determined whether a next container image in the repository container image list satisfies this condition. After the last container image in the repository container image list is determined and the related operation is executed, the container image controller proxy component replies task completion to the master node, and the reply is encrypted by the communication secret and then sent to the master node, so that the prune task is completed. Meanwhile, the container image management module of the master node receives the reply and then executes state feedback recording.

Figure 5:
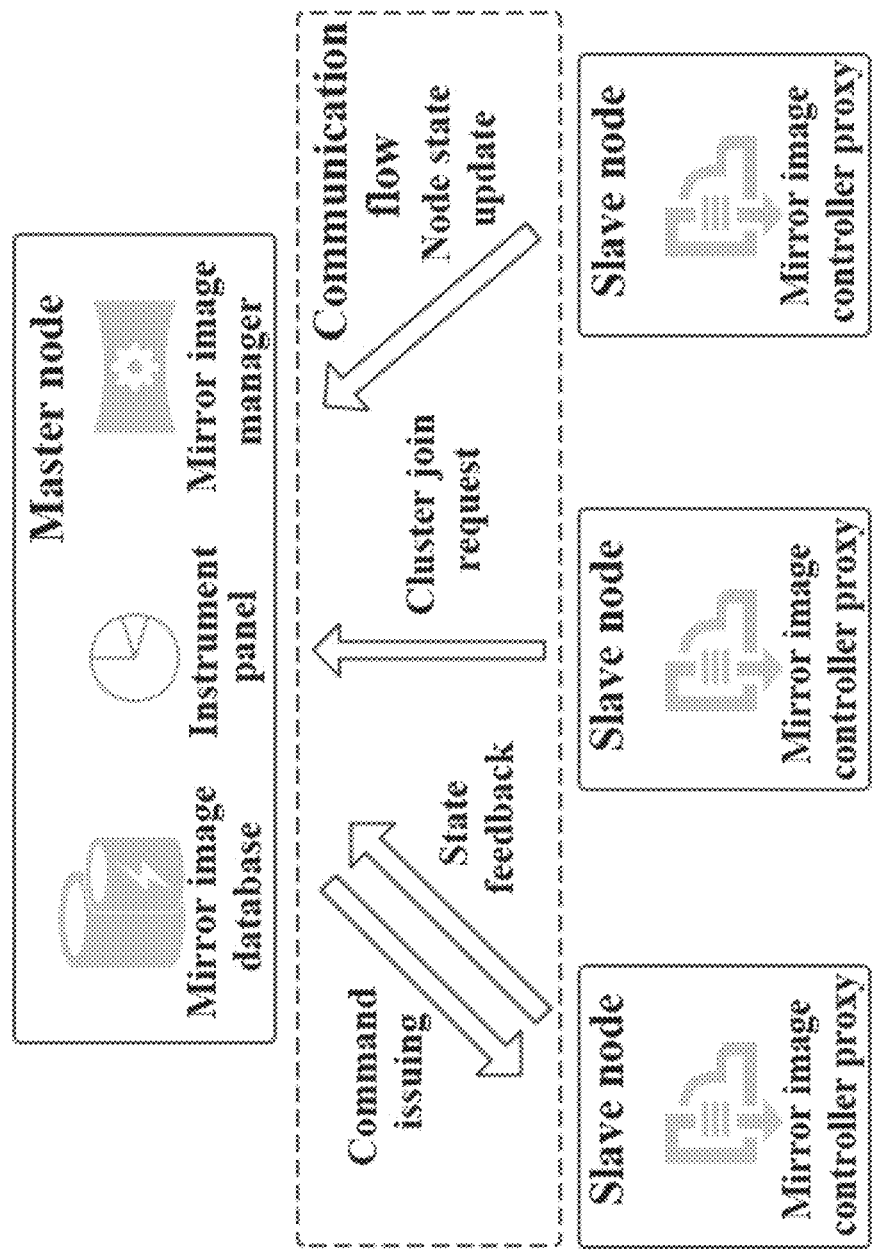
FIG. 5 is a schematic diagram of a container image management system for distributed clusters according to a specific embodiment of the disclosure.

In a third aspect, the disclosure provides a container image management system for distributed clusters (as shown in FIG. 5), the system comprising at least one master node described above and at least one worker node described above.

When the system comprises a plurality of master nodes, each master node is connected to a load balancer in the network, the worker node sets the IP address of the master node as the serving IP address of the load balancer during configuration, and the distributed databases running on the plurality of master nodes are used for data synchronization between different master nodes.

In a fourth aspect, the disclosure provides a method for container image management of distributed clusters.

A master node store node information of all nodes in a distributed database. The node information comprises the current state of the worker node, command execution content, command execution time and a command execution state log which are all stored in a distributed database of the master node. The current state of the worker node comprises node name, node role, an operating system of the worker node and the kernel version of the operating system, the operation version of a container runtime on the worker node, the time when the worker node joins a cluster, and the time when the worker node is updated.

The master node receives request content comprising a request destination and command execution content, the command execution content comprising an execution operation field and an executed container image list.

The master node determines whether the request content is validated, and stores the request content in the container image database if the request content is validated. If it is determined that the request destination in the request content is a specified single worker node or a specified group of worker nodes, the container image database is inquired to obtain the IP address corresponding to the worker nodes, and the command execution content is transmitted to the worker nodes according to the corresponding IP address. The operation contained in the command execution content comprises a pull operation, an update operation, a delete operation and a prune operation.

A worker node calls a container runtime to execute a corresponding operation on a container image repository, and transmits state feedback content to the master node, the container image repository comprising a container image repository deployed locally and a container image repository deployed remotely.

The master node receives the state feedback content from the worker node, and stores the receipt time and the state feedback content in the distributed database.

In the disclosure, worker nodes regularly and automatically update container image resources and prune outdated container image resources by acquiring an execution task of a master node, so that the utilization of resources stored in a cluster is improved. The worker nodes pull container image resources in advance by acquiring the container image pull, update or delete tasks of the master node, so that the deployment preparation time for a deep learning task is shortened. It is applicable to large-scale distributed cluster system architectures.

It should be understood by those skilled in the art that the embodiments of the disclosure may be provided as methods, systems or computer program products. Therefore, the disclosure may be in form of a full hardware embodiment, a full software embodiment, or an embodiment of combination of software and hardware. Moreover, the disclosure may also be in form of a computer program product implemented on one or more computer usable storage mediums (comprising but not limited to magnetic disk memories, CD-ROMs, optical memories, etc.) containing computer usable program codes.

The disclosure is described with reference to the flowcharts and/or block diagrams of the methods, devices (systems) and computer program products in the embodiments of the disclosure. It should be understood that each flow and/or block in the flowcharts and/or block diagrams as well as the combinations of flows and/or blocks in the flowcharts and/or block diagrams may be implemented by computer program commands. These computer program commands may be provided to general-purpose computers, dedicated computers, embedded processors or processors of other programmable data processing devices to generate a machine, so that an apparatus configured to implement functions of one or more flows in the flowcharts and/or one or more blocks in the block diagrams may be generated by the commands executed on computers or processors of other programmable data processing devices.

These computer program commands may also be stored in a computer readable memory which can direct computers or other programmable data processing devices to operate in a specific mode, so as to enable the commands stored in the computer readable memory to generate a manufacture product containing a command apparatus. The command apparatus implements the functions designated in one or more flows in the flowcharts and/or one or more blocks in the block diagrams.

These computer program commands may also be loaded in computers or other programmable data processing devices so as to perform a series of operation steps on the computers or other programmable data processing devices to generate processing implemented by the computers, so that commands executed on the computers or other programmable devices can provide steps for implementing functions designated in one or more flows in the flowcharts and/or one or more blocks in the block diagrams.

It will be obvious to those skilled in the art that changes and modifications may be made, and therefore, the aim in the appended claims is to cover all such changes and modifications.

What is claimed is:

1. A container image management system for distributed clusters, the system comprising at least one master node and at least one worker node:
wherein:
the at least one master node comprises a container image database, a request input module and a container image management module;
the container image management module is responsive when the container image management module establishes the connection to the container image database, then it is permitted to read/write from/into the container image database;
the container image database is a distributed database configured to store node information of the container image management system;
the request input module is configured to receive request content comprising a request destination and command execution content, the command execution content comprising an execution operation field and an executed container image list;
the container image management module is configured to: generate a public key and a private key used for encrypted authentication; verify whether the request content acquired by the request input module is validated, and store the request content in the container image database if the request content is validated; and determine the request destination in the request content, inquire the container image database to obtain an IP address corresponding to a specified single worker node or a specified group of worker nodes if the request destination is the specified single worker node or the specified group of worker nodes, and transmit the communication secret and the command execution content to the specified single worker node or the specified group of worker nodes according to the IP address corresponding to the specified single worker node or the specified group of worker nodes, operations contained in the command execution content comprising a pull operation, an update operation, a delete operation and a prune operation;
the container image management module is further configured to receive state feedback content transmitted by the specified single worker node or the specified group of worker nodes, and store a receipt time and the state feedback content in the container image database;

the at least one worker node comprises: a container image controller proxy component and a container image repository;

the container image repository is configured to store container images on a worker node, and distinguish different container images by container image names and container image tags;

the container image controller proxy component is configured to transmit the node information of the worker node to the master node, the node information comprising a current state of the worker node, command execution content, command execution time and a command execution state log which are all stored in the distributed database of the master node, the current state of the worker node comprising the node name, the node role, the operating system of the worker node and the kernel version of the operating system, the operation version of a container runtime on the worker node, the time when the worker node joins a cluster, and the time when the worker node is updated;

the container image controller proxy component is further configured to acquire the request content from the master node, the request content comprising the communication secret and the command execution content;

the worker node authenticates the communication secret and executes, on the container image repository, an operation corresponding to the command execution content by calling the container runtime, the container image repository comprising a local container image repository and a container image repository deployed remotely, the operation comprising a pull operation, an update operation, a delete operation and a prune operation; and the worker node transmits the state feedback content to the master node;

if the request content passes the validity check of the master node and if the request destination is a specified single worker node or a specified group of worker nodes, the specified single worker node or specified group of worker nodes corresponding to the IP address receives the command execution content transmitted by the master node; and if the request destination is a specified tag, worker nodes corresponding to the IP address in a worker node list corresponding to the specified tag receives the command execution content transmitted by the master node; and when the system comprises a plurality of master nodes, each master node is connected to a load balancer in a network, the worker node sets the IP address of the master node as the serving IP address of the load balancer during configuration, and distributed databases running on the plurality of master nodes are used for data synchronization between different master nodes;

the request content acquired from the master node by the container image controller proxy component of the worker node comprises a command execution time and an execution period; if neither the command execution time nor the execution period is set, a corresponding operation is executed immediately; if the request content comprises only the command execution time but not the execution period, the container image control proxy component of the worker node blocks and waits for the command execution time before executing the corresponding operation; if the command execution time is not set but only the execution period is set, the container image controller proxy component of the worker node immediately executes the corresponding operation, and asynchronously enables blocking and indefinitely waits for a next execution period to execute the corresponding operation; and, if both the command execution time and the execution period are set, the container image control proxy component of the worker node blocks and waits for the command execution time before executing the corresponding operation, and the container image control proxy component of the worker node enables blocking and indefinitely waits for a next execution period to execute the corresponding operation after a first execution is completed.

2. The system of claim 1, wherein the container image management module further comprises a Web server; the Web server is configured to block monitoring, and wait for a cluster join request from the worker node that applies for joining a cluster; the cluster join request comprises the node name, the node role, the operating system, the kernel version of the operating system, the version of the container runtime, the request time, and the communication secret; when the cluster join request sent by the worker node is received, the container image management module authenticates the communication secret in the cluster join request, and the node name, the node role, the operating system, the kernel version of the operating system, the version of the container runtime, the request time and communication secret in the cluster join request are written in the container image database after the authentication is successful; an update time for the worker node that applies for joining the cluster is set and written in the container image database, and a cluster join success message is returned to the cluster.

3. The system of claim 1, wherein in response to the joining of the worker node into the cluster, the container image management module stores all worker nodes and tags of the worker nodes as a datasheet in the container image database; the container image management module determines whether the request destination acquired by the request input module contains a specified tag; inquire a worker node list corresponding to a specified tag in the container image database to obtain the IP address corresponding to the specified tag in the list if the request destination acquired by the request input module is the specified tag; and, transmit the command execution content to the worker node corresponding to the specified tag according to the IP address corresponding to the specified tag, the operation contained in the command execution content comprising a pull operation, an update operation, a delete operation and a prune operation.

4. The system of claim 1, wherein the master node further comprises a fault message generation and report module; the fault message generation and report module is configured to generate a message for the cause of failure if the verification of the request content by the container image management module is unsuccessful or if the verification of the request content by the container image management module is successful but the container image management module is not permitted to read/write from/into the database, and serialize the message as a fault text file for reporting.

5. The system of claim 1, wherein when the container runtime is running, the container image controller proxy component acquires a communication key-value pair from environmental variables, and initiates a cluster join request to the master node by the IP address and the communication secret of the master node acquired using the communication key-value pair, the cluster join request comprising a node name, a node role, an operating system, the kernel version of the operating system, the version of the container runtime, the request time and the communication secret; and, if the communication secret is successfully authenticated, the container image controller proxy component receives, from the master node, a message indicating success in joining the cluster.

6. The system of claim 5, wherein the worker node further comprises a fault generation and report module; when the container image controller proxy component determines that the container runtime operates abnormally, failing to acquire the communication key-value pair from the environmental variables or not receiving the master node's response to the cluster join request after a preset time, the fault generation and report module determines an unsuccessful cluster joining, and is configured to generate a message for the cause of failure and serialize the message as a fault text file for reporting.

* * * * *